(12) United States Patent
Blakeslee et al.

(10) Patent No.: US 6,539,696 B2
(45) Date of Patent: Apr. 1, 2003

(54) TENSION SPRING FLOTATION AGRICULTURAL RAKES

(75) Inventors: Edward A. Blakeslee, Ephrata, PA (US); Douglas D. Sorensen, Ronks, PA (US)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 09/844,751

(22) Filed: Apr. 27, 2001

(65) Prior Publication Data

US 2002/0157372 A1 Oct. 31, 2002

(51) Int. Cl.[7] ............................................. C01D 78/00
(52) U.S. Cl. ............................. 56/377; 56/375; 56/397
(58) Field of Search ........................ 56/375, 379, 377, 56/378, 396, 397

(56) References Cited

U.S. PATENT DOCUMENTS

| 2,595,788 | A | | 5/1952 | Hill | 56/377 |
|---|---|---|---|---|---|
| 2,657,518 | A | | 11/1953 | Hill et al. | 56/377 |
| 2,738,640 | A | * | 3/1956 | Schroeppel | 56/377 |
| 2,781,626 | A | | 2/1957 | Happe et al. | 56/377 |
| 2,829,486 | A | | 4/1958 | Skromme et al. | 56/377 |
| 2,966,773 | A | * | 1/1961 | Van Der Lely | 56/377 |
| 3,834,142 | A | * | 9/1974 | Johston et al. | 56/377 |
| 4,231,218 | A | * | 11/1980 | Delgado | 56/377 |
| 4,343,142 | A | * | 8/1982 | Allen | 56/397 |
| 4,723,402 | A | | 2/1988 | Webster et al. | 56/377 |
| 4,910,951 | A | * | 3/1990 | Reilly et al. | 56/376 |
| 5,203,154 | A | * | 4/1993 | Lesher et al. | 56/366 |
| 5,327,709 | A | * | 7/1994 | Webb | 56/14.4 |
| 5,459,987 | A | * | 10/1995 | Hining et al. | 56/377 |
| 5,493,853 | A | * | 2/1996 | Tonutti | 56/377 |
| 6,073,431 | A | * | 6/2000 | Osborne et al. | 56/15.7 |
| 6,212,865 | B1 | * | 4/2001 | Peeters et al. | 56/345 |

* cited by examiner

Primary Examiner—Robert E. Pezzuto
Assistant Examiner—Nathan Mammen
(74) Attorney, Agent, or Firm—Larry W. Miller; J. William Stader

(57) ABSTRACT

An agricultural rake basket flotation system that employs tension springs to support a portion of the weight of the rake basket, toward the lateral ends thereof, thus allowing for a more sensitive and complete response to encounters with obstacles and irregularities in the ground level.

3 Claims, 7 Drawing Sheets

TENSION SPRING FLOTATION AGRICULTURAL RAKES

FIELD OF THE INVENTION

The present invention relates generally to header flotation systems for pull-type crop-treating equipment in the agricultural industry, and particularly to a header flotation system for use with a pull-type agricultural rake.

BACKGROUND OF THE INVENTION

As a rake is pulled through the field of crop, the rake reel, supported within the basket, is rotated with the tines moving as close to the ground as possible to maximize crop handling. It is a common shortcoming of pull-type rakes to exhibit poor flotation characteristics, and thus frequently the tines contact the ground, often resulting in costly downtime and repairs.

Header flotation is a desirable design characteristic that permits the header to move vertically whenever an obstacle is encountered or the ground is uneven over the length of the header. "Lateral" flotation is a refinement whereby one end of the header may rise, for example upon encountering uneven ground, without causing the other end to rise as much as the first end, i.e., the header is allowed to follow the contour of the ground. Neither flotation nor lateral flotation are of much importance or value in the operation of equipment unless these features are enhanced by the necessary degree of sensitivity. More specifically, flotation is almost a valueless concept unless the flotation structure, or mechanism, is sufficiently sensitive to quickly react to encounters with obstacles and/or uneven ground.

Many agricultural rakes incorporate a compression spring as part of the basket lifting linkage to assist in raising the rake over obstacles encountered in the field such as rocks, gopher mounds, branches, etc. Attention is directed to U.S. Pat. Nos. 2,829,486; 2,781,626; 2,657,518 and 2,595,788 for examples of compression springs used in such systems. The primary problem encountered when using a compression spring in a flotation system is that it has too large a spring constant to adequately lift the rake basket over an obstacle, so the rake basket does not, in fact, float, as is desirable and was intended for the equipment represented in those patents. A compression spring is also not adjustable for different types of terrain or heavy add-on options, such as castor wheels and additional tines. Thus, the primary drawback of a compression system is that it lacks the necessary sensitivity.

Since flotation is a major feature, and one of the most desirable characteristics of an agricultural rake and other similar agricultural devices, improvements are usually found to be commercially and operationally important.

It would be desirable and beneficial to provide a flotation system for an agricultural rake that would overcome the above-noted disadvantages of known rake flotation systems.

SUMMARY OF THE INVENTION

Accordingly, one object of the present invention is to provide an agricultural rake with an improved flotation system that will reduce the frequency of contact of rake tines with the ground and other objects.

Another object of the instant invention is to provide a flotation system for an agricultural rake that employs tension springs rather than compression springs to improve the lateral flotation characteristics of the rake basket.

A further object of the instant invention is to provide an improved tension spring flotation system for use with agricultural rakes and other similar pull-type equipment.

These and other objects, features and advantages are accomplished according to the instant invention by providing an agricultural rake basket flotation system that employs tension springs to support a portion of the weight of the rake basket, toward the lateral ends thereof, thus allowing for a more sensitive and complete response to encounters with obstacles and irregularities in the ground level.

BRIEF DESCRIPTION OF THE DRAWINGS

The advantages of this invention will be apparent upon consideration of the following detailed description of the invention, especially when taken in conjunction with the accompanying drawings wherein.

DETAILED DESCRIPTION OF THE PREFERRED EMBODIMENT

Figure 1:
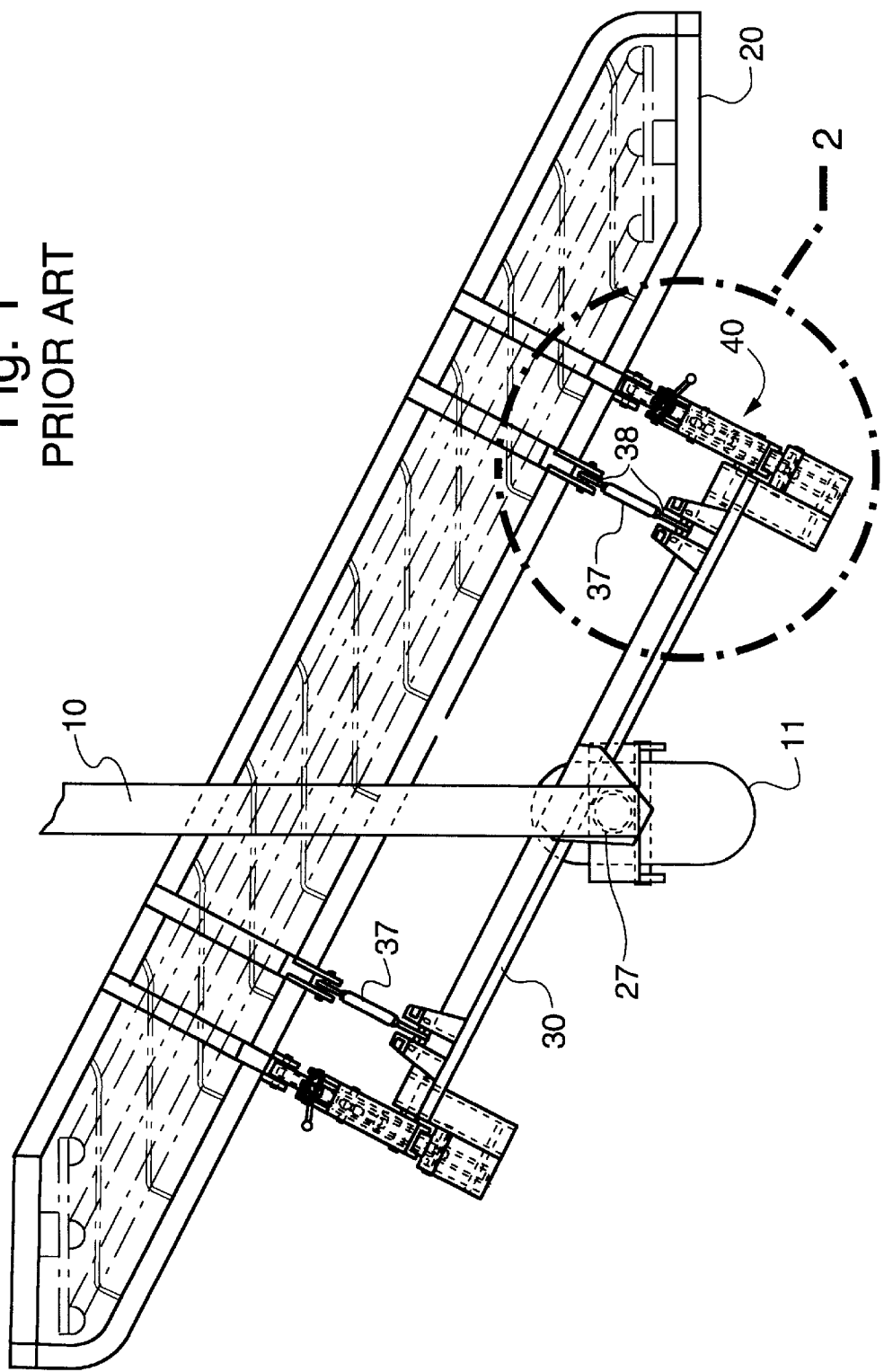
FIG. 1 is a top plan view of an exemplary prior art rake.
Figure 2:
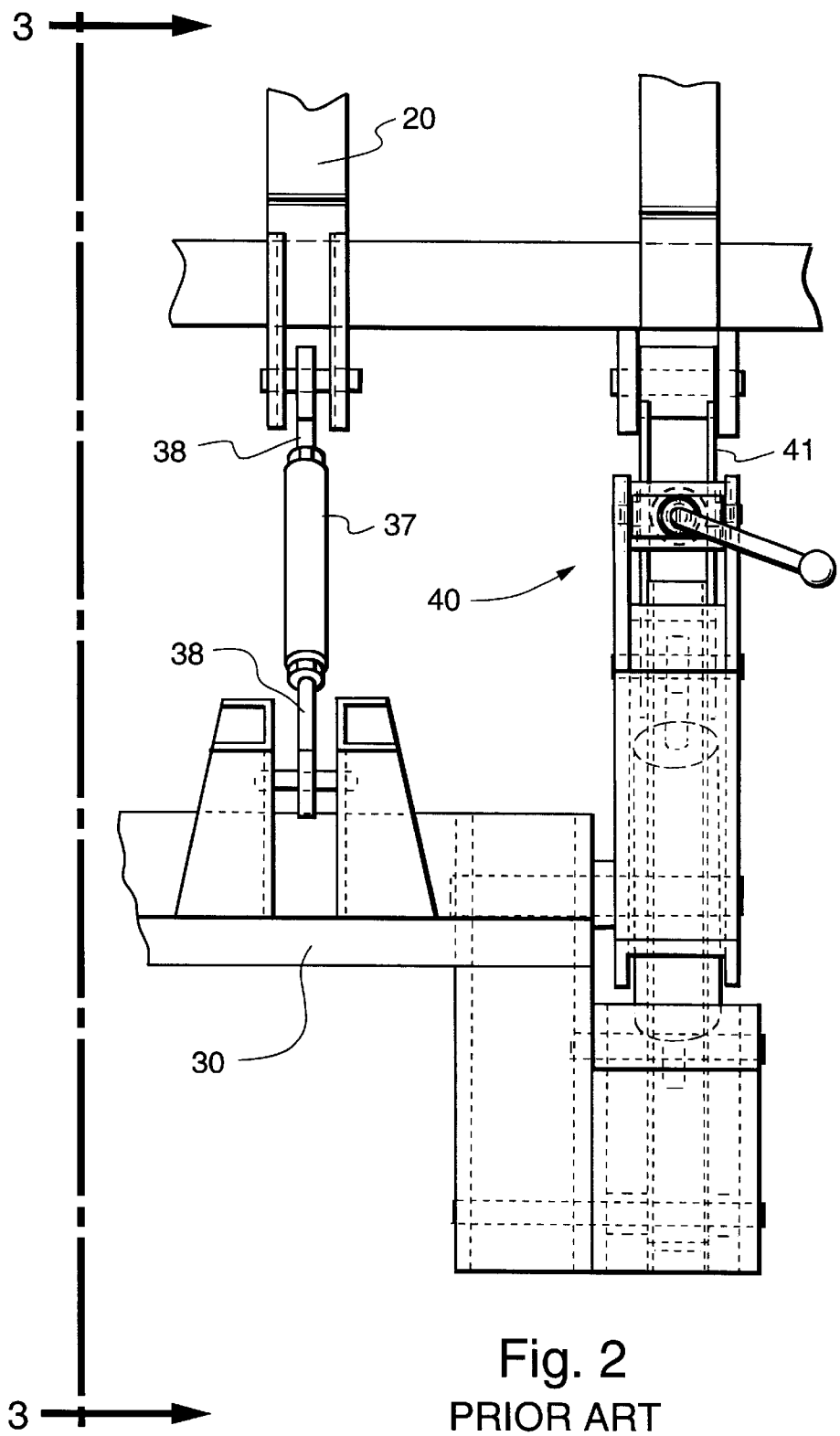
FIG. 2 is an enlarged view of that portion of FIG. 1 enclosed in circle 2, showing the details of the prior art header lift mechanism.
Figure 3:
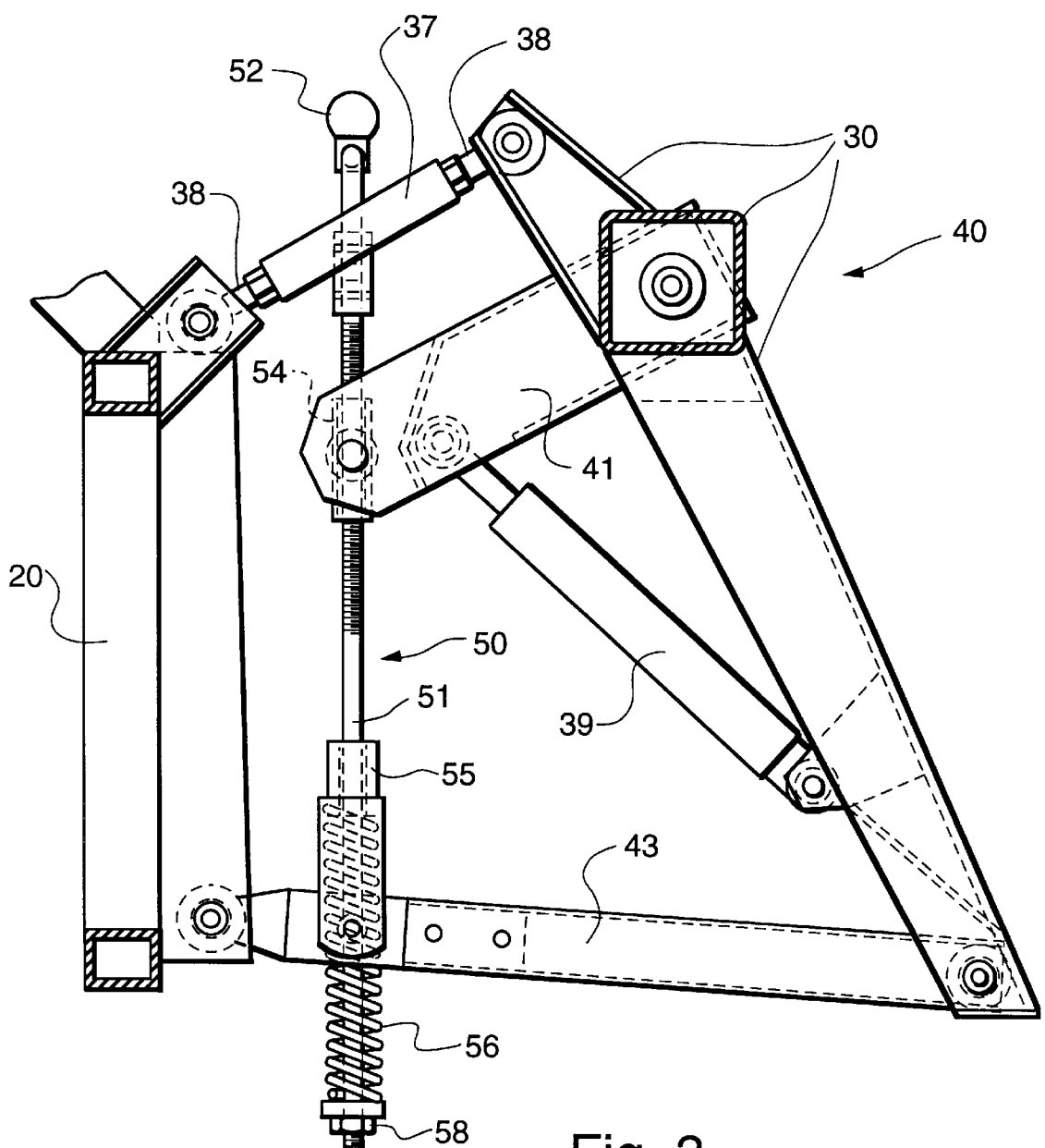
FIG. 3 is a view of FIG. 2 taken along line 3—3, showing the header lift mechanism, the flotation mechanism and the height adjustment mechanism of the prior art.

Any reference herein to the terms "left" or "right" are used as a matter of mere convenience, and are determined by standing at the rear of the machine facing in its normal direction of travel. The side delivery rake shown as prior art in FIGS. 1 through 3 is part of a unitized rake implement commonly used in the agricultural industry today, and as generally shown, for example, in U.S. Pat. No. 4,723,402 (which is incorporated herein in its entirety by reference). Side delivery rakes have, of course, been around for many years, and can be found operating as individual machines or in a unitized structure usually employing two rakes. The individual stand-alone rakes would have a slightly modified frame, and would be supported by at least two wheels.

Referring now to the drawings and particularly to FIG. 1, a top plan view of a well-known prior art rake can be seen as it would be used in a unitized rake structure. A frame arm, or tongue, 10 supports a conventional side delivery rake basket 20 driven by a hydraulic motor, not shown. Frame arm 10 may be attached directly to a prime mover, such as a tractor, through a common frame with another rake, as characteristic of the unitized rake disclosed in the '402 patent incorporated above. The hydraulic motor and plumbing is conventional in nature and has not, in order to promote clarity and simplicity, been depicted in any of the drawings (see the '402 patent for details). The rake basket 20 is supported by a main frame assembly 30 movably mounted on wheel spindle 27 positioned at the rearward end of frame arm 10. Main frame assembly 30 is connected to rake basket 20 by a header lift mechanism 40 to permit a generally vertical movement of the rake basket 20 relative to the ground upon which wheel 11 rests, i.e., raising and lowering. Hydraulic lift cylinder 39, operatively associated with header lift mechanism 40, provides a conventional lift force for moving the rake basket relative to the ground. The flotation spring 50, also operatively associated with header lift mechanism 40, provides conventional flotation, as will be described further below, for rake basket 20. As can be seen more clearly in FIG. 1, each end of the main frame assembly 30 includes a header lift mechanism 40. Since, as will be discussed below, each header lift mechanism also includes a flotation mechanism, the rake basket 20 is provided with some degree of the lateral flotation.

As can also be seen in FIG. 1, a pair of links 37 interconnects main frame assembly 30 and rake basket 20 at spaced apart locations along the longitudinal axis of rake basket 20. Each such link includes (FIG. 2) a tie rod 38 at both ends thereof that permits manual adjustment of the tilt of rake basket 20. Generally, these two links should be adjusted to the same length.

Referring now more specifically to FIGS. 2 and 3, the header lift mechanism 40 will be further described. A pair of laterally spaced apart lift arms 41 form part of the linkage for raising and lowering the rake basket 20 relative to the main frame 30. The lift arms 41 are pivotally connected to main frame assembly 30 and support rake basket 20. Hydraulic lift cylinders 39, interconnecting main frame assembly 30 and lift arm 27, provide the necessary force to raise and lower rake basket 20 relative to the ground. Lower link 43 is pivotably connected at a first end to main frame assembly 30 and at a second end to rake basket 20.

A tine height adjustment mechanism 50, best seen in FIG. 3, provides not only a manual means of adjusting the operating height of the tines relative to the ground, but also provides some small degree of flotation for the rake basket 20. An elongated partially threaded rod 51 has a handle 52 at the top end thereof and extends through threaded block 54, through yoke 55, through lower link 43, spring 56, all held together by a nut 58. The main threaded portion of rod 51 is engaged with the threaded block 54, and block 54 is, in turn, rotatably pinned to lift arm of 41. A second threaded portion of rod 51, at the lower end thereof is engaged by nut 58 to hold the height adjustment mechanism together. Thus, rotation of handle 52 causes threaded block 54, and lift arm 41, to move either upwardly or downwardly, modifying the relative positions between rake basket 20 and main frame assembly 30 (i.e., the height of the tines above the ground when in the operating position). Compression spring 56 provides some degree of flotation to the rake basket 20, but the amount is limited by the free play in the spring due to its length, the amount of basket weight supported by the spring, and the total space between coils.

Referring now to FIGS. 4 through 8, the improved flotation system of the instant invention will be described. Reference numerals corresponding to those in prior art FIGS. 1 through 3 refer to similar structure or elements.

Figure 6:
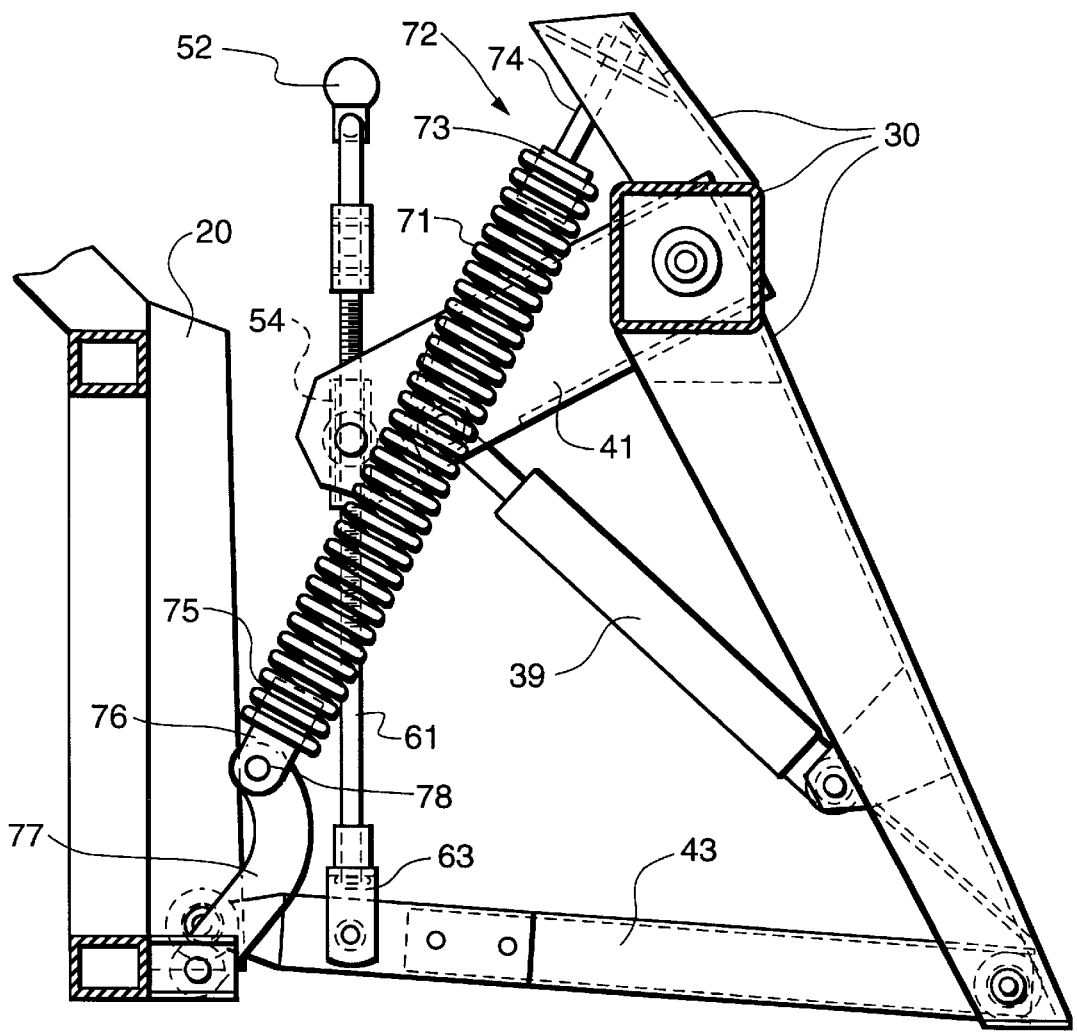
FIG. 6 is a view of FIG. 5 taken along line 6—6, showing additional details of the flotation, header lift and height adjustment mechanisms of the instant invention.

As best seen in FIG. 6, height adjustment mechanism 60 is comprised of an elongated partially threaded rod 61 which has a handle 52 at the top end thereof and is pivotally affixed at the lower end thereof to lower link 43 by yoke 63. Rod 61 extends through threaded block 54 as described previously. Rotation of handle 52 raises or lowers rake basket 20 relative to main frame 30 for a fine adjustment of the height of the tines above the ground.

Basket tilt is controlled by a single link 37 that interconnects main frame assembly 30 and rake basket 20 at the center of the longitudinal axis of rake basket 20.

Figure 4:
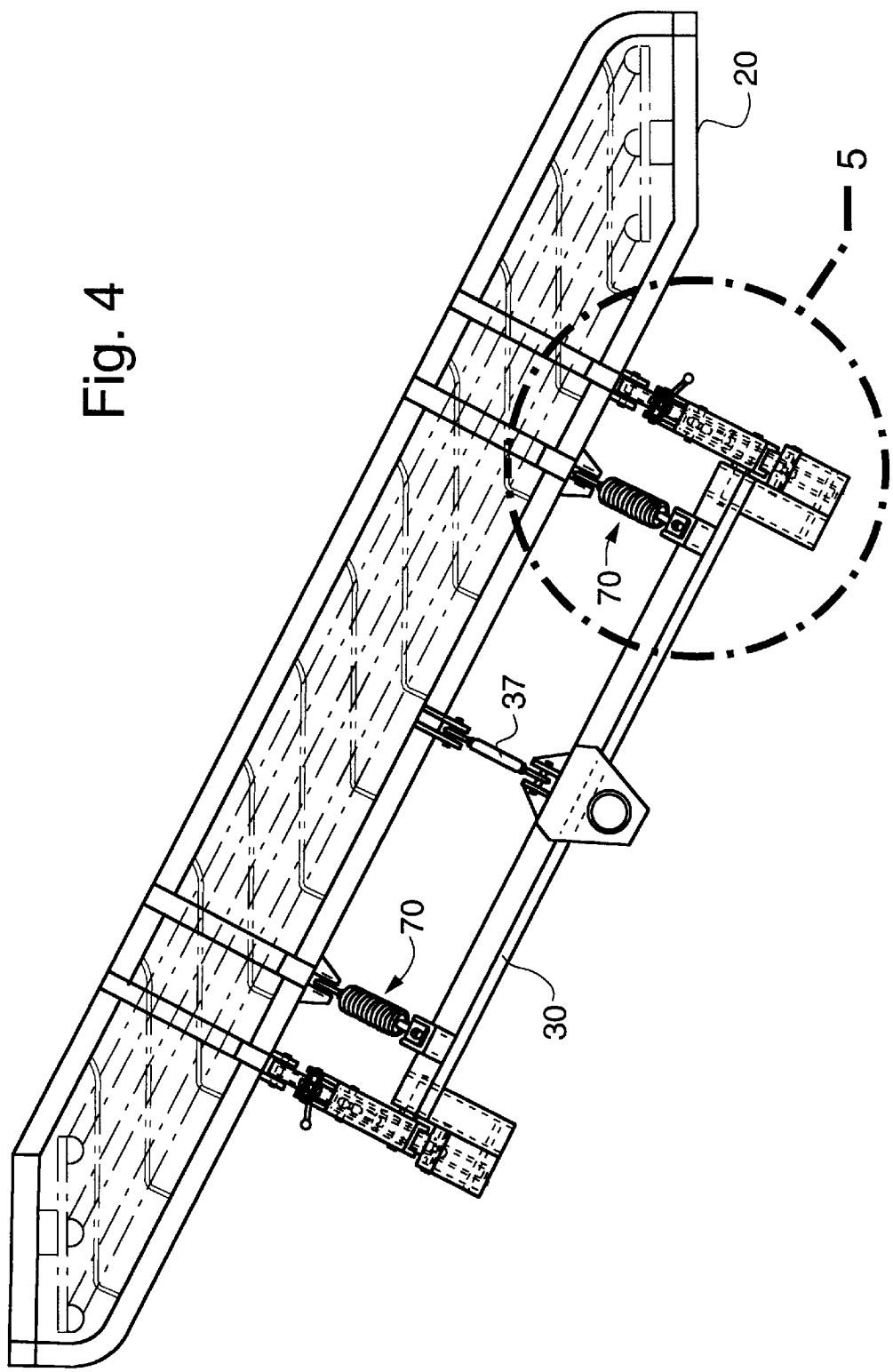
FIG. 4 is a top plan view of an exemplary rake employing the principles of the instant invention.
Figure 5:
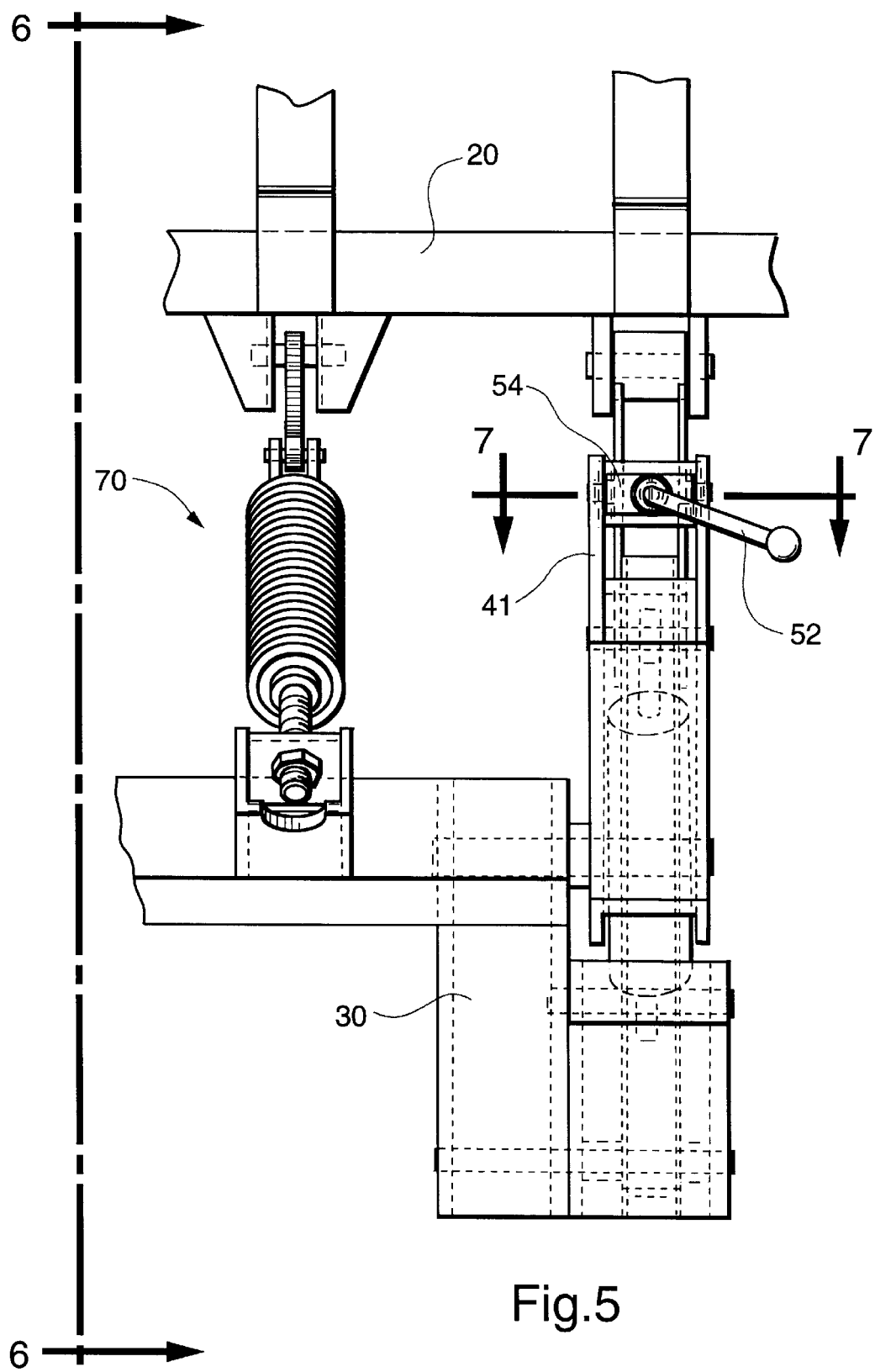
FIG. 5 is an enlarged view of that portion of FIG. 4 enclosed in circle 5, showing details of the flotation, height adjustment and header lift mechanisms of the instant invention.

Flotation is provided by two laterally spaced apart flotation mechanisms generally identified by reference numerals 70 in FIG. 4. Flotation mechanism 70 is generally comprised of four components (see FIG. 6): tension spring 71, connector 72, connector 75 and banana-shaped link 77. Connector 72 is comprised of an externally threaded block 73, threaded into and thus held by spring 71, and of rod 74 that is affixed to main frame assembly 30 by a nut. Connector 78 is comprised of an externally threaded block 75, like block 73, that is threaded into spring 71, and link 76. Banana-shaped link 77 is pivotally fixed at one in to link 76 and at the other to rake basket 20.

Figures 7, 8:
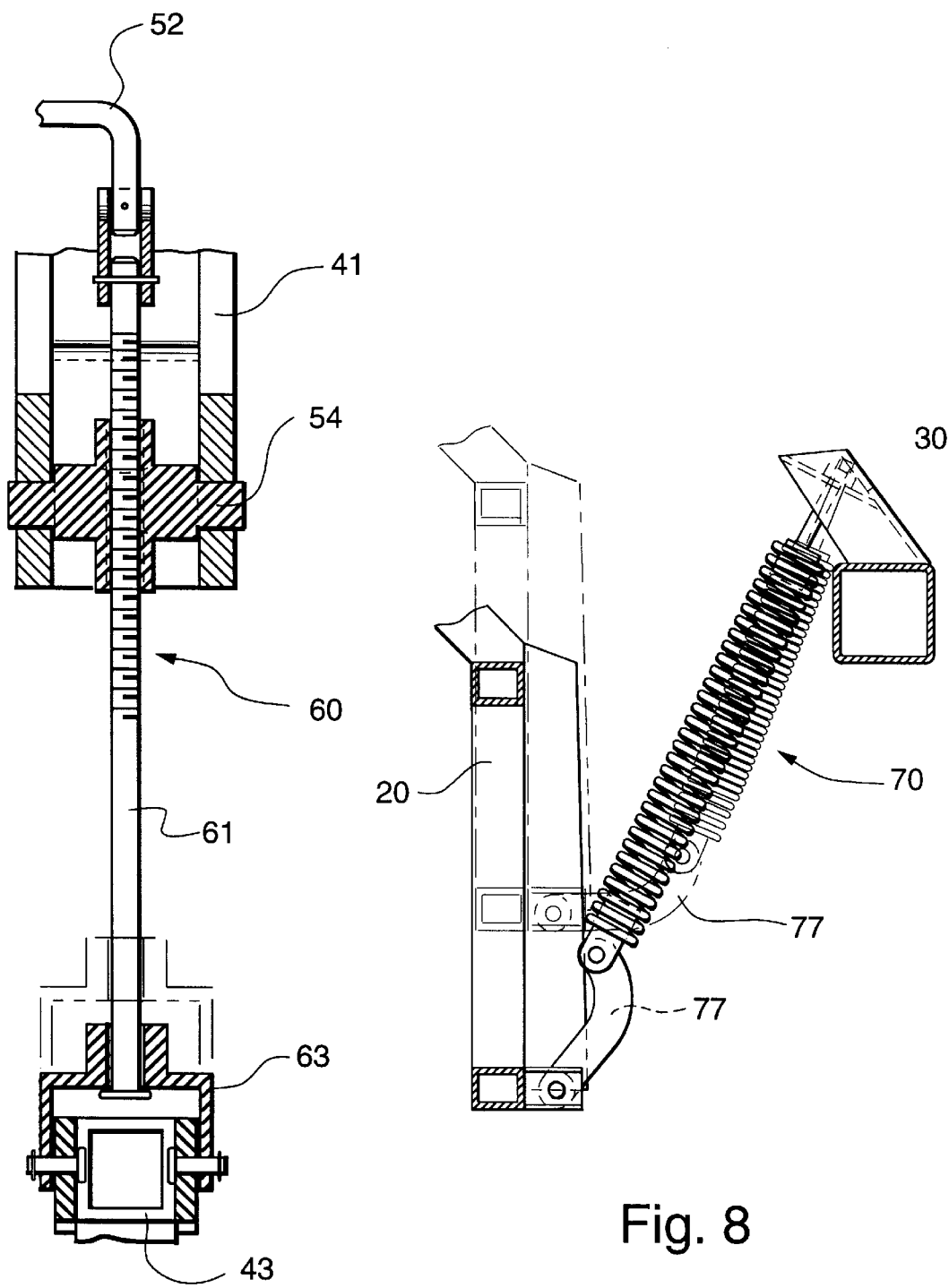
FIG. 7 is a cross-sectional view of the height adjustment mechanism, taken along line 7—7 of FIG. 5.
FIG. 8 is a partial cross-sectional view of the tension spring in two different positions of flotation.

The banana-shaped link, as best seen in FIG. 8, provides protection to the tension spring 71 by adding its length to that of the spring when the rake basket is in its lowermost operating position, thereby preventing the tension spring 71 from being overextended. Link 77 also prevents tension spring 71 from being buckled when the basket is raised into the transport position, i.e., when the spring is collapsed to its solid length.

Looking at FIG. 6, handle 52 is rotated manually to fine-tune the height of the tines relative to the ground and operating conditions. Turning the handle adjusts the relative position between lower link 43 and main frame assembly 30, thereby raising or lowering rake basket 20. Hydraulic cylinder 39 is used to make the gross adjustment of height for the rake basket 20, i.e., raising the basket for transport or lowering it into operating position. When the rake basket is in the operating position, the two tension springs 71 are generally in the position shown in this Fig. Lateral flotation is provided by the two spaced apart springs through absorption of the lateral movement of the rake basket by the tension spring. Since the springs are relatively free to expand in length, they can absorb more basket movement, and thus provide more flotation. In the transport position, as best seen in FIG. 8 in phantom, the springs may fully collapse, but, because of the banana-shaped link 77, do not buckle.

Flotation mechanism 70 thus provides lateral flotation to the rake basket as it moves across uneven ground, or when it engages an obstacle such as a rock.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:
1. An agricultural rake comprising:
   an elongated main frame supported by a ground-engaging wheel; said main frame including a generally forwardly extending draft member adapted for connection to a prime mover and affixed to said main frame generally centrally between the ends thereof;
   an elongated transverse subframe affixed to said main frame and movable generally vertically relative thereto;

an elongated non-ground engaging header including a parallel bar rake reel with tines, said header longer than said main frame and affixed to said subframe;

said main frame affixed to said subframe by a pair of flotation mechanisms spaced apart along the length of said main frame and said subframe, toward the ends of said main frame, each said flotation mechanism including a tension spring partially supporting the weight of said header from said main frame, each said tension spring connected at a first end to said main frame and to said header at a second end via a banana-shaped link whereby lateral flotation is provided to said header by the tension springs, yet the tension springs are not overstretched with the header in the operating position or buckled when in the transport position;

said main and subframes each have a bottom side adjacent the ground when in operation and an opposing top side, and each said tension spring is connected at its said first end adjacent the top side of said main frame and said respective banana-shaped link is connected adjacent the bottom side of said subframe;

a pair of height adjustment mechanisms interconnecting said main frame and said subframe, one adjacent each flotation mechanism and including a variable length link including a threaded rod manually rotatable to fine-tune the height of said tines above the ground and further including a pair of lower links, one adjacent each flotation mechanism and including a lower link pivotably interconnecting the bottom sides of said main and subframes and a cantilevered rigid upper link fixed to said main frame and extending generally forwardly therefrom toward said subframe;

a hydraulic cylinder interconnecting said main frame and subframe to raise and lower said subframe and said header relative to said main frame and the ground between a raised transport position and a lowered operational position; and said variable length link pivotably interconnects respective said lower and upper links, said respective hydraulic cylinders pivotably interconnecting said main frame and said upper link.

2. The agricultural rake of claim 1, wherein:

said main and subframes each have a bottom side adjacent the ground when in operation and an opposing top side, and each said tension spring is connected at its said first end adjacent the top side of said main frame and said respective banana-shaped link is connected adjacent the bottom side of said subframe; and a single adjustable link interconnects said main and subframes generally centrally adjacent the top sides thereof.

3. The agricultural rake of claim 1, wherein:

each said flotation mechanism further includes an adjustable length rod interconnecting said first end of said tension spring and said main frame to further adjust the amount of flotation.

* * * * *